T. L. VALERIUS.
ICE CREAM FREEZER.
APPLICATION FILED APR. 14, 1911.
1,158,592.
Patented Nov. 2, 1915.
3 SHEETS—SHEET 2.
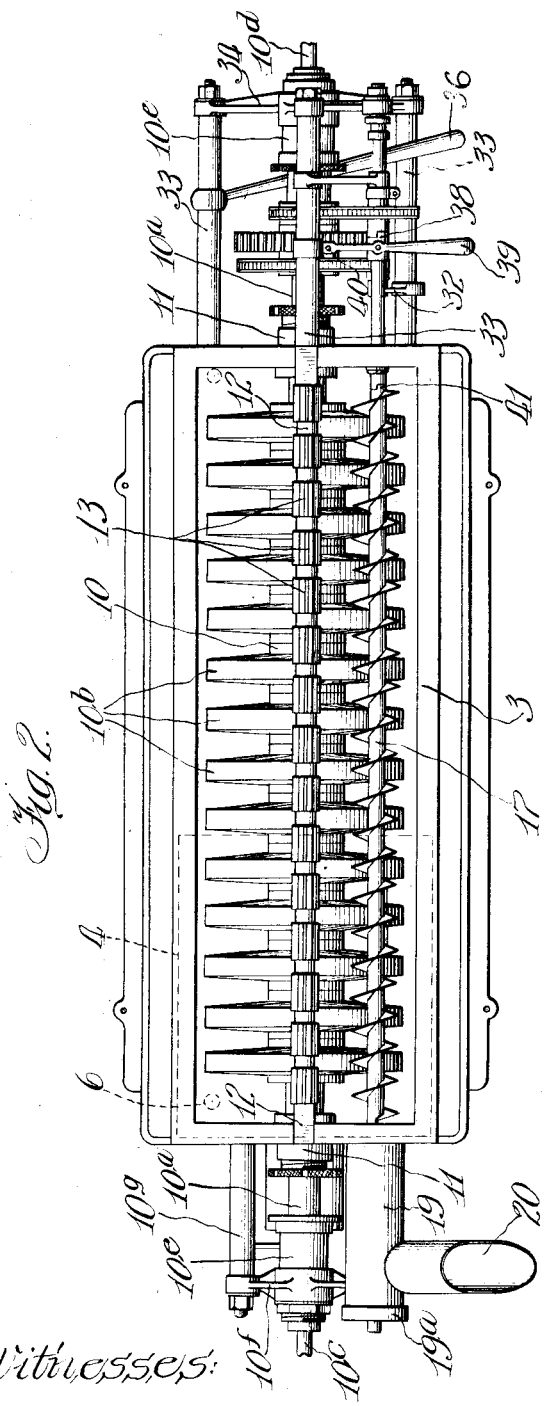
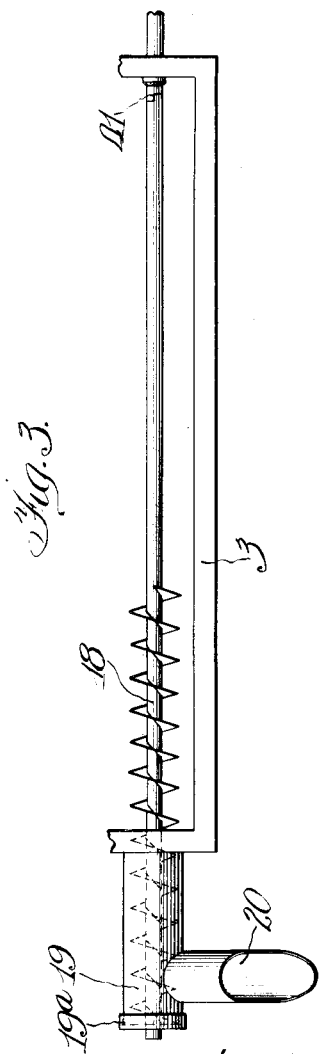

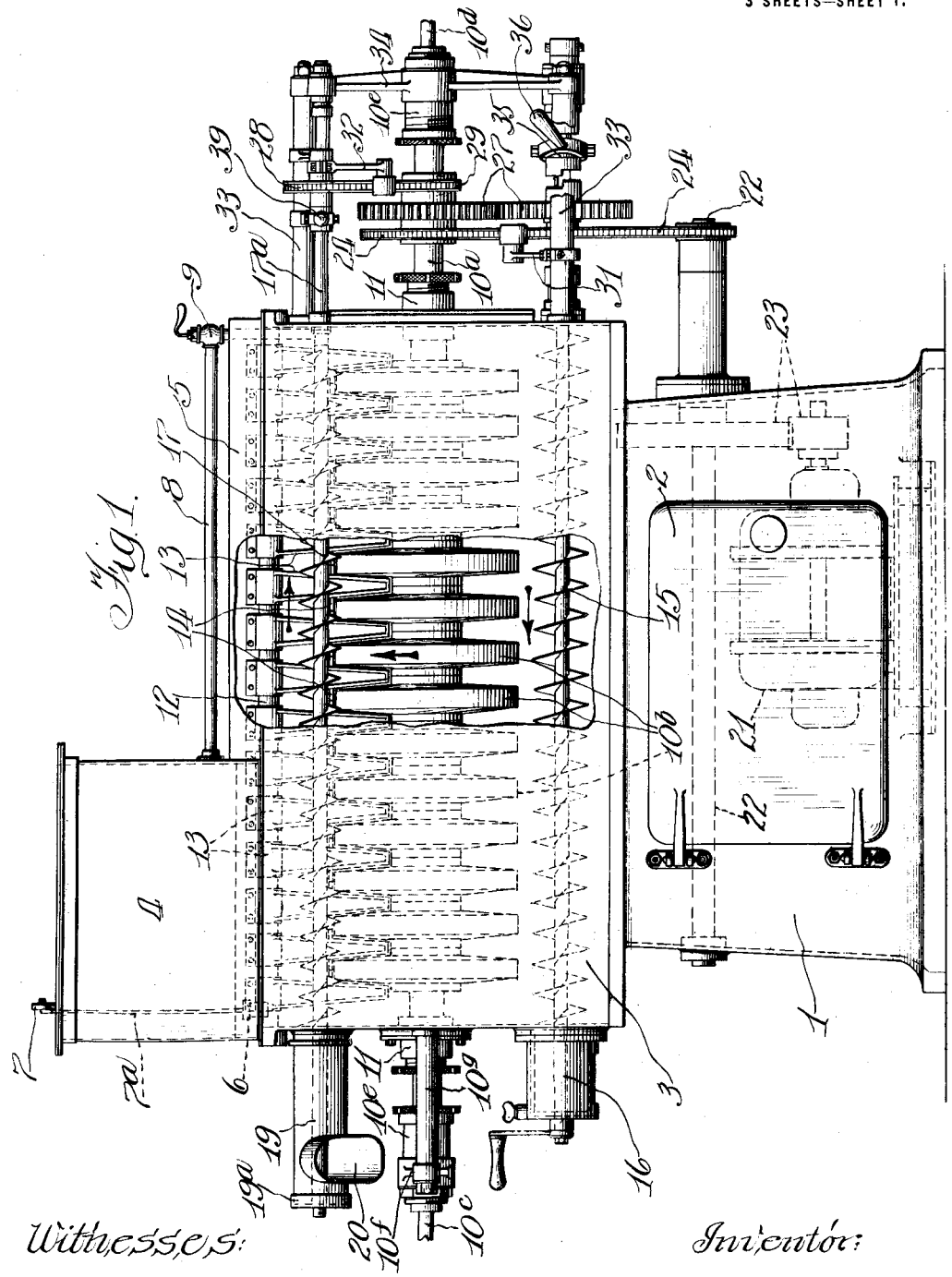

T. L. VALERIUS.
ICE CREAM FREEZER.
APPLICATION FILED APR. 14, 1911.
1,158,592.
Patented Nov. 2, 1915.
3 SHEETS—SHEET 3.
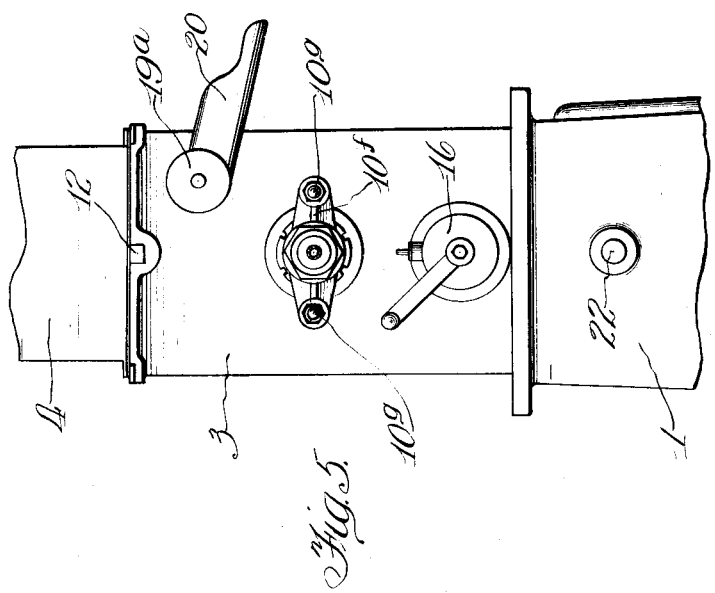
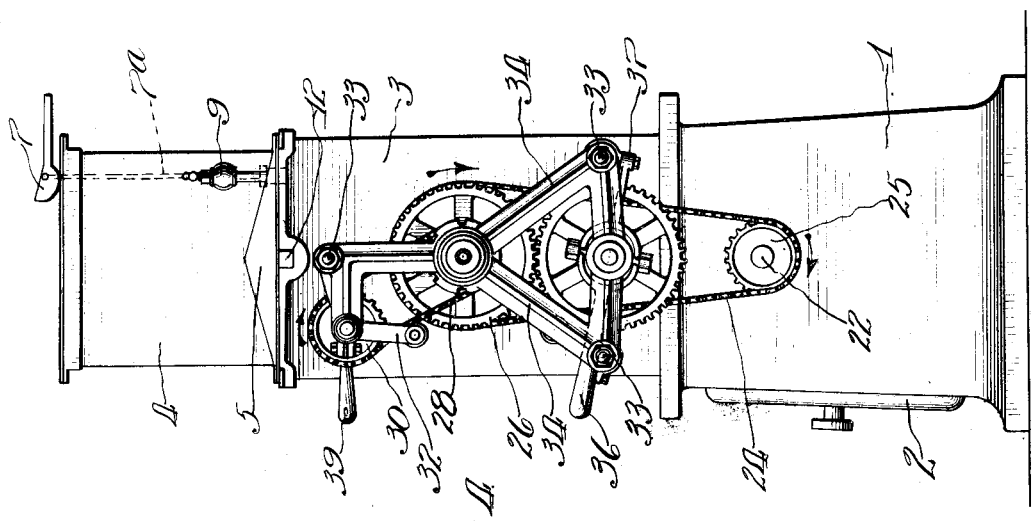
Witnesses:
Inventor:
Theodore L. Valerius,
By Luther L. Miller
Atty.

UNITED STATES PATENT OFFICE.

THEODORE L. VALERIUS, OF FORT ATKINSON, WISCONSIN, ASSIGNOR TO CREAMERY PACKAGE MANUFACTURING COMPANY, OF CHICAGO, ILLINOIS, A CORPORATION OF ILLINOIS.

ICE-CREAM FREEZER.

1,158,592.        Specification of Letters Patent.        Patented Nov. 2, 1915.

Application filed April 14, 1911. Serial No. 620,989.

*To all whom it may concern:*

Be it known that I, THEODORE L. VALERIUS, a citizen of the United States, residing at Fort Atkinson, in the county of Jefferson and State of Wisconsin, have invented certain new and useful Improvements in Ice-Cream Freezers, of which the following is a specification.

This invention contemplates an improved ice cream freezer which is especially well adapted to meet the requirements of large modern ice cream plants.

One of the objects of the invention is to produce a freezer which is adapted either for "continuous" or for "batch" operation, as desired.

Another object is to provide an efficient machine which has a large capacity and yet is very compact so that it occupies a relatively small floor space when installed in a plant.

A further purpose is to accomplish a thorough circulation or mixing of the "custard" especially when the machine is used for batch freezing.

Other objects and advantages of the invention will be set forth in the following description and pointed out in the claims.

In the accompanying drawings, Figure 1 is a side elevation, with parts broken away, of an ice cream freezer embodying the features of my invention. Fig. 2 is a top plan view of the machine with the custard-reservoir and cover removed. Fig. 3 is a fragmentary view similar to Fig. 2, but showing another form of conveyer in the machine. Fig. 4 is an elevation taken from the right-hand end of Fig. 1. Fig. 5 is a fragmentary elevation of the opposite end of the machine.

The embodiment of my invention which I have herein shown, by way of example, comprises a base 1 which is preferably hollow to receive a drive motor and gears, to be later described, said base having a door 2 to permit access to its interior. Sppported by the base 1 is a receptacle or tank 3 adapted to receive the "mix" or custard to be frozen. Supported by the tank 3 and forming a partial cover therefor is a custard reservoir 4. The portion of the tank 3 not closed by the reservoir 4 is closed by a cover 5 of any suitable form. A valve 6 controls the flow of custard from the reservoir 4 to the tank 3 at one end of the latter, said valve being adapted to be operated by means of a cam lever 7 and link 7ª. This valve is used when the machine is being operated as a batch freezer. When the machine is used in "continuous" operation, the custard is conveyed from the storage reservoir 4 to the opposite end of the tank 3 through a pipe 8, said pipe having a valve 9 therein.

Within the tank 3 is a rotary freezing member 10 adapted to be maintained at a temperature below the freezing point to freeze the custard in said tank. This freezing member may be of any suitable type, as, for example, that shown and described in my prior Patent No. 899,928, issued September 29, 1908. It may be here generally described as consisting of a tubular shaft $10^a$ mounted in stuffing box bearings 11 in the end walls of the tank 3, said pipe having a plurality of intercommunicating hollow disks $10^b$ thereon. A circulation of brine or other freezing medium may be maintained through the freezing member by means of a pump and reservoir (not shown), the brine preferably entering the freezer from the left-hand end (Fig. 1) through a pipe $10^c$ and leaving through a pipe $10^d$ at the opposite end of the member 10. Leakage between the shaft $10^a$ and the pipes $10^c$ and $10^d$ may be prevented by stuffing boxes $10^e$ mounted in brackets $10^f$ and 34, said brackets being carried respectively at the outer ends of rods $10^g$ and 33 projecting from opposite ends of the tank 3. While the freezing member is preferably of the form just described, I do not wish to be understood as limiting it to any particular form.

A bar 12 disposed longitudinally in the upper portion of the tank 3 and having its ends supported thereby carries a plurality of scraper fingers 13, said fingers comprising, in the present instance, hub portions adjustably secured to the bar 12 and depending portions which extend downwardly between the hollow disks $10^b$. In the freezing operation the custard within the receptacle 3 adheres to the disks $10^b$ and the fingers 13 serve to scrape the adhering frozen custard from the disks. Preferably the fingers are in the form of light frames having large openings therethrough to permit of a free circulation of the liquid. Flanges 14 at the sides of the fingers 13 serve to scrape the frozen material from the peripheries of the disks 10$^b$.

Rotatably mounted in the tank 3 below the freezing member 10 and centrally of the tank is a screw conveyer 15. At one end of said conveyer is a valve structure 16 of any suitable type which controls the exit of the material from the tank 3 when the machine is used for batch operation. In the upper portion of the tank 3, preferably at one side thereof, is mounted a screw conveyer 17, which, when the machine is used as a batch freezer is preferably of the form shown in Fig. 2. In the latter case the conveyers 15 and 17 are pitched in the same direction and are rotated in opposite directions.

When the machine is to be used for "continuous" operation the conveyer 17 is preferably replaced by a conveyer 18 (Fig. 3), the latter being shorter than the former and being pitched in an opposite direction. At the end of the conveyer is a tube 19 having a lateral discharge spout 20 thereon. As shown in Fig. 3 the "continuous" conveyer 18 extends to the end of the tube 19 so that the frozen cream will be discharged through the spout 20.

The parts are driven by suitable mechanism which is preferably arranged as follows: Within the hollow base 1 is positioned an electric motor 21 which transmits power to a main shaft 22 through intermeshing gears 23. The shaft 10$^a$ of the freezing member is rotated through the medium of a driving chain 24 extending over sprocket wheels 25 and 26 upon the shafts 22 and 10$^a$ respectively. From the shaft 10$^a$ movement is imparted to the lower conveyer 15 through the medium of intermeshing gears 27 upon the shaft 10$^a$ and the projecting end of the conveyer shaft 15. The upper conveyer may be driven by a sprocket chain 28 extending over sprocket wheels 29 and 30 respectively upon the shaft 10$^a$ and the projecting end of the upper conveyer shaft. 31 and 32 are slack take-up devices for the sprocket chains 24 and 28 respectively. The device 32 is adjustably mounted upon the bearing for the upper conveyer shaft 17$^a$. The member 31 is adjustably secured upon one of the three frame members 33 which, in the present instance, are arranged triangularly and extending outwardly from the end of the tank 3. The outer ends of these members are connected by means of the bracket or frame 34, said frame having bearings therein for the outer ends of the various shafts of the machine.

The shaft of the lower conveyer is connected to its drive gear 27 through a suitable clutch device 35, said clutch being operated by means of a lever 36 pivoted at one end at 37 to a bearing carried by one of the lower rods 33. In a like manner the upper conveyer may be connected to its driving wheel by means of a clutch 38, said clutch being operable by a hand lever 39 pivoted at 40 to a bearing upon the upper one of the frame rods 33.

The operation of the machine when used as a batch freezer is as follows: A suitable quantity of custard having been admitted through the valve 6 from the reservoir 4 to the tank 3, the freezing medium is started in circulation through the freezing member 10 and the motor 21 is started to set the parts in motion. The lower conveyer 15 moves the custard in the lower portion of the tank to the left, as indicated by the arrow in Fig. 1, while the upper conveyer 17 moves the partially frozen custard which rises to the top, to the right, as indicated by the arrow. In this way a thorough circulation of the custard is continuously maintained from end to end of the machine. The rotation of the freezing member 10 causes a rotary circulation of the custard in the tank. These two forces acting together accomplish a very efficient circulation and mixing of the material. When the custard has been frozen to the desired consistency, the upper conveyer 17 is stopped by throwing out its clutch and the valve 16 is opened. The lower conveyer 15 will now move the frozen or partially frozen cream through the discharge valve 16, from whence it passes to suitable storage or packing vessels.

When the machine is to be used in "continuous" operation, the lower conveyer 15 is disconnected from its driving gear and the upper conveyer 17 is either reversed in direction of rotation by means of a reversing gear (not shown) or, as I prefer, the short conveyer 18 is substituted for the conveyer 17 by removing the cap 19$^a$ of the tube 19 and withdrawing the conveyer 17 longitudinally out through said tube and replacing it with the conveyer 18. 41 is a shaft coupling of any common or preferred construction to connect the conveyers to their complementary portion 17$^a$. Custard is now admitted from the reservoir 4 to the tank 3 through the pipe 8 and valve 9 to the right-hand end of the trough. The lower conveyer 15 may be left idle while the upper one is continuously rotated. The freezing brine entering the freezing member 10 from the left-hand end of the machine maintains said left-hand end of the freezing member at a lower temperature than the right-hand end, since the brine receives the heat from the custard in its passage to the right through said freezing member. The custard entering the right-hand end of the tank 3 comes in contact first with the warmer end of the freezing member, and thence passes along said freezing member to the left-hand end of the machine where the greater portion of the actual freezing occurs. As the frozen cream is scraped from the disks 10$^b$ it accumulates at the surface of the custard and is moved outwardly through the tube 19 and discharge spout 20 by the conveyer 18. The material discharged from the spout 20 is received in suitable packing or storage cans.

It will be noted that, taking into consideration the large capacity of the machine, it is very compact and occupies a relatively small floor space. Since all of the operating levers, spouts, etc., are adjacent the forward side of the machine, two of the machines may be installed with their backs close together. This is important when several of these machines are installed in a plant. It will further be seen that the machine may be efficiently used for either continuous operation or for batch freezing as desired.

While I have hereinbefore described the embodiment herein shown in particular detail, I recognize the fact that various changes within the scope of my invention will occur to persons skilled in this art and I therefore do not limit myself to the precise construction herein shown.

I claim as my invention:

1. An ice-cream freezer comprising a tank, a rotary freezing member therein, means coöperating with said freezing member for removing the frozen material therefrom, a conveyer in said tank beneath said freezing member, and a second conveyer above said freezing member.

2. An ice-cream freezer comprising a tank, a rotary freezing member disposed longitudinally therein, a screw conveyer rotatably mounted in said tank beneath said freezing member, a valve through which said conveyer is adapted to discharge material, and a conveyer in the upper portion of the tank adapted to move material in a direction opposite to the first mentioned conveyer to provide an end to end circulation.

3. An ice-cream freezer comprising a tank, a rotary freezing member therein, and two conveyers positioned one above and the other below said freezing member to provide for circulation of the material.

4. An ice-cream freezer comprising a tank, a rotary freezing member therein, a custard reservoir above said tank, a valve controlling the discharge of material from said reservoir into one end of said tank, and means to conduct material from said reservoir to the other end of said tank.

5. An ice-cream freezer comprising a tank, a rotary freezing member mounted therein, two screw conveyers rotatable in said tank one above and the other below said freezing member, a drive shaft, a connection between said drive shaft and said freezing member for rotating the latter, and driving connections between said freezing member and said screw conveyers.

6. An ice-cream freezer comprising a tank, a rotary freezing member therein, and means above and below said freezing member for causing an end to end circulation within the tank, said freezing member causing a rotary circulation.

7. An ice-cream freezer comprising a tank, a rotary freezing member therein, a conveyer below said freezing member and adapted to move the material in one direction, a conveyer above said freezing member adapted to move material in the opposite direction, and means in the upper portion of the tank adapted to scrape the congealed material from said freezing member.

8. An ice-cream freezer comprising a tank, a rotary freezing member therein, a conveyer within said tank below said freezing member, and a conveyer above said freezing member, the last mentioned conveyer being removable.

9. An ice-cream freezer comprising a tank, a rotary freezing member therein comprising a plurality of hollow disks, a bar positioned above said freezing member and having a plurality of fingers adapted to scrape material from said disks, a conveyer removably mounted in the upper portion of said tank at one side of said bar, and a conveyer in the lower portion of said tank.

10. An ice-cream freezer comprising a tank, a freezing member rotatably mounted therein, and comprising a plurality of hollow disks, a bar positioned above said freezing member and having fingers extending downwardly between said disks to scrape the frozen material from the sides thereof, said fingers having laterally extending flanges adapted to scrape frozen material from the periphery of said disks, means for supplying material to said tank, and discharging means.

11. An ice-cream freezer comprising a tank having refrigerating means, an outlet in the lower portion of said tank, a screw conveyer arranged to discharge the cream through said outlet, a conveyer in the upper portion of said tank, means for driving said conveyers, and a clutch connection between the first mentioned conveyer and said driving means.

12. An ice-cream freezer comprising a tank, a rotary freezing member therein, scraping means coöperating with said freezing member, a screw conveyer in said tank longitudinally beneath said freezing member, a valve structure in one end of said tank and alined with said screw conveyer, means for closing said valve structure, a second screw conveyer extending longitudinally of said freezing member in the upper part of the tank, a discharge spout in one end of said tank alined with said second conveyer, and means for driving said conveyers.

13. In an ice-cream freezer, the combination with a tank and a rotary freezing member therein, of means within said tank for causing an end to end circulation therein, a portion of said means being removable through one end of the tank.

14. An ice-cream freezer comprising a tank, a rotary freezing member therein, means above said member for scraping the congealed material therefrom, discharge means in the lower portion of said tank, and a longitudinally removable screw conveyer in the upper portion of said tank at one side of said freezing member.

15. An ice-cream freezer comprising an elongated horizontal tank, a single freezing member disposed longitudinally therein, a screw conveyer extending longitudinally of said tank beneath said freezing member, a valve through which the conveyer is adapted to discharge material in operation, an opening in the upper portion of said tank, and a longitudinally extending screw conveyer above and at one side of said freezing member, said conveyer being removable.

16. An ice-cream freezer comprising a tank, refrigerating means, cream discharge means, an opening in the upper portion of one end of said tank, and a screw conveyer insertible and withdrawable through said opening.

17. In an ice-cream freezer, the combination of a tank, a rotary freezing member, scraping means coöperating with said freezing member, a circulating conveyer in the upper portion of said tank, an outlet in the lower portion of said tank, a screw conveyer arranged to discharge material through said outlet, said outlet being at one end of said tank, and the shafts of said rotary freezing member and said conveyers projecting from the opposite end of said tank, a main drive shaft, and operative means connecting said drive shaft with said freezing members and conveyers.

18. An ice-cream freezer comprising an elongated tank, a rotary freezing member therein, scraping means coöperating with said freezing member, a plurality of screw conveyers in said tank extending longitudinally of said rotary freezing member, one of said screw conveyers being positioned beneath said freezing member and the other of said conveyers above said freezing member, a valve structure and a discharge spout mounted on one end of said tank in alinement with the respective conveyers, driving means, and means for connecting said conveyers to said driving means to cause an end to end circulation during operation, said valve structure being arranged to be opened upon the completion of the freezing, and one of said conveyers being arranged to discharge the frozen cream through said valve structure.

19. An ice-cream freezer comprising an elongated tank, a rotary freezing member disposed longitudinally within said tank, scraping means above said freezing member and coöperating therewith, a reservoir positioned above said tank, valve means controlling the discharge from said reservoir into said tank, a screw conveyer disposed longitudinally beneath said freezing member, a valve structure mounted in one end of said tank and alined with said screw conveyer, said valve structure being arranged to be opened at the completion of freezing, and said conveyer being adapted to discharge the cream through said structure, and a conveyer arranged to move material in the direction opposite to that caused by said lower conveyer to provide an end to end circulation during operation.

In testimony whereof I hereunto affix my signature in the presence of two witnesses.

THEODORE L. VALERIUS.

Witnesses:
J. F. SCHREINER,
R. J. SMITH.